W. E. GALLAGHER.
FILTER.
APPLICATION FILED MAY 14, 1920. RENEWED APR. 12, 1922.
1,418,785.
Patented June 6, 1922.
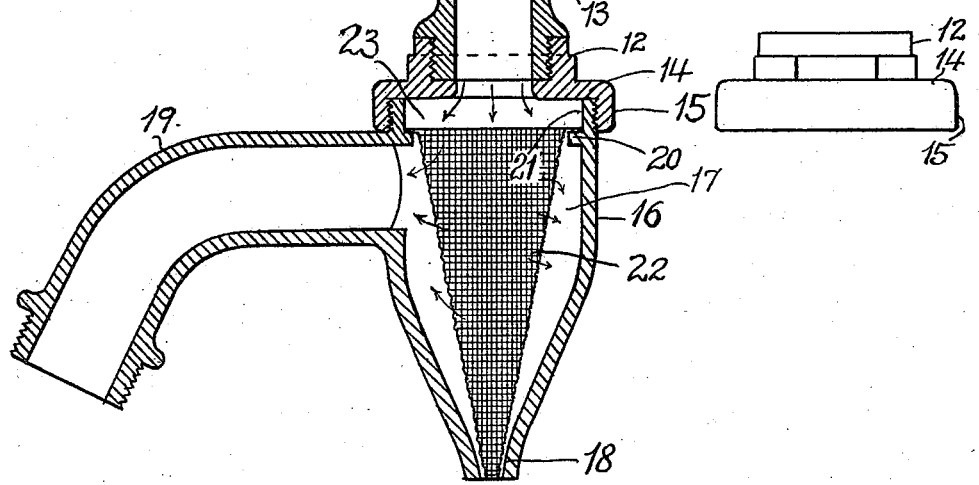
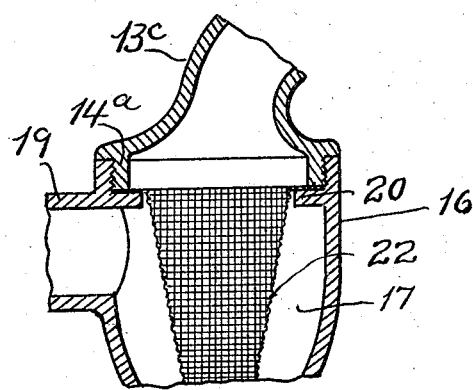
INVENTOR:
W. E. Gallagher
ATT'YS.

UNITED STATES PATENT OFFICE.

WILLIAM E. GALLAGHER, OF FRAMINGHAM, MASSACHUSETTS.

FILTER.

1,418,785. Specification of Letters Patent. Patented June 6, 1922.

Application filed May 14, 1920, Serial No. 381,413. Renewed April 12, 1922. Serial No. 551,832.

*To all whom it may concern:*

Be it known that I, WILLIAM E. GALLAGHER, a citizen of the United States, residing at South Framingham, in the county of Middlesex and State of Massachusetts, have invented new and useful Improvements in Filters, of which the following is a specification.

This invention relates to a filter comprising a tubular casing having at its upper end portion means for engagement with a faucet, and an inwardly-projecting strainer rest, and at its lower end a contracted nozzle constituting a waste outlet, the casing including a filtered water chamber with a lateral outlet for filtered water, and a frusto-conical strainer, the larger end of which is seated on said rest, while its smaller end enters said waste outlet. A filter thus characterized is disclosed by Patent 711,535, dated October 21, 1902.

My invention is embodied in certain improvements, hereinafter described and claimed, on the filter disclosed by said patent.

Of the accompanying drawings, forming a part of this specification:

Figure 1 is a sectional view of a filter embodying my improvements.

Figure 2 is a side view of the flanged nipple shown in section by Figure 1.

Figure 3 is a fragmentary sectional view, showing a modification.

The same reference characters indicate the same parts in all of the figures.

In the drawings, 12 represents an internally-threaded nipple, formed to engage an external thread on a standard faucet 13, said nipple being provided with an enlargement, including an annular head 14 surrounding the nipple, and an internally-threaded annular flange 15 on said head, of greater diameter than the nipple.

16 represents a tubular casing, having an enlarged end portion forming a receiving chamber 17, and a tapering end portion forming a contracted waste outlet 18. The casing is provided with a lateral nozzle 19, communicating with the chamber 17 to discharge filtered water therefrom. The casing is provided internally with an annular strainer rest 20 above the nozzle 19. The larger end of the casing has an up-standing annular extension 21, detachably engaged with the flange 15.

22 represents a frusto-conical strainer, seated at its larger end on the rest 20, its smaller end being within the waste outlet 18. Said strainer may be of any suitable material, such as woven wire, textile fabric, etc., its upper end being suitably stiffened to engage the rest 20.

It will now be seen that the casing extension 21 and nipple head 14 form a space 23 between the nipple 12 and the larger end of the strainer, the strainer rest 20 being spaced below the nipple head 14, so that the larger end of the strainer is at the bottom of said space.

I call the space 23 a stream-spreading space, because the pressure of the water flowing from the faucet to the strainer is reduced in said space before entering the strainer. Consequently the water flows at a more moderate rate through the strainer than would be the case if the space 23 were not provided. Said space, which is of considerably greater diameter than that of the bore of the faucet 13, permits the employment of a strainer of considerably larger diameter at its receiving end than the diameter of the faucet bore, hence the effective area of the strainer is considerably larger than is the case in a filter embodying the construction disclosed by the above-mentioned patent.

The stream-spreading space 23 is of substantially the same internal diameter as the chamber 17, and permits such spreading of the stream of water flowing from the faucet that the pressure of the water in the chamber 17 and sediment outlet 18 is reduced and an objectionably rapid or wasteful discharge of water through the outlet 18 is prevented.

The nipple enlargement formed by the head 14 and flange 15 involves a corresponding enlargement of the casing 16, chamber 17, strainer rest 20, and strainer 22, so that the capacity of the filter is considerably increased over that of the filter disclosed by the above-mentioned patent.

The head 14 constitutes, in effect, an enlargement of the faucet, said enlargement being provided with an internal screw-thread to engage an external thread on the casing 16.

Figure 3 shows a modification in which the faucet 13° is provided with an integral enlargement 14ª having an external screw-thread adapted to engage an internal thread on the enlarged end of the casing 16.

The action is the same in each of the illustrated embodiments of the invention. The embodiment shown by Figures 1 and 2 is preferable when a standard faucet 13 of the type shown by Figure 1 is employed.

I claim:

1. A filter comprising an internally-threaded nipple formed to engage an external thread on a standard faucet, and provided with an enlargement including an annular head surrounding the nipple and an internally-threaded annular flange on said head, of greater diameter than said nipple, a tubular casing having an enlarged end portion forming a receiving chamber of greater diameter than said nipple, a tapering end portion forming a contracted sediment outlet, a lateral nozzle communicating with said chamber to discharge filtered water therefrom, an internal strainer rest above said nozzle and an externally-threaded extension of substantially the same internal diameter as said chamber, projecting above said rest and engaged with said internally-threaded flange, and a frusto-conical strainer seated at its larger end on said rest and extending therefrom into said sediment outlet, the larger end of the strainer being of greater diameter than the said nipple and spaced from the nipple head by said rest, said extension and nipple head forming a stream-spreading space above the strainer, in which a stream of water flowing from the faucet is spread to a diameter substantially equal to that of the larger end of the strainer to reduce water pressure in the chamber, strainer and sediment outlet, whereby an objectionably forcible discharge of water through the sediment outlet is prevented.

2. In combination, a faucet having an enlargement at its discharge end of greater diameter than the bore of the faucet, and provided with a screw thread, a tubular casing having an enlarged end portion, screw-threaded to engage the thread on said enlargement, a tapering end portion forming a contracted sediment outlet, an internal strainer rest located below said enlargement, and a lateral nozzle below said strainer rest, the faucet enlargement, the enlarged end of the casing, and the strainer rest forming a stream-spreading space of greater diameter than the bore of the faucet, and a frusto-conical strainer seated at its larger end on said rest and extending therefrom into said sediment outlet, the larger end of the strainer being of greater diameter than the bore of the faucet, and adapted to receive from said stream-spreading space a stream of water, the pressure of which is reduced to prevent an objectionably forcible discharge through the sediment outlet.

In testimony whereof I have affixed my signature.

WILLIAM E. GALLAGHER.